No. 781,900. PATENTED FEB. 7, 1905.
J. E. NIGHTINGALE.
INDICATOR DEVICE FOR MACHINES FOR MEASURING AREAS OF SURFACES.
APPLICATION FILED JUNE 11, 1904.
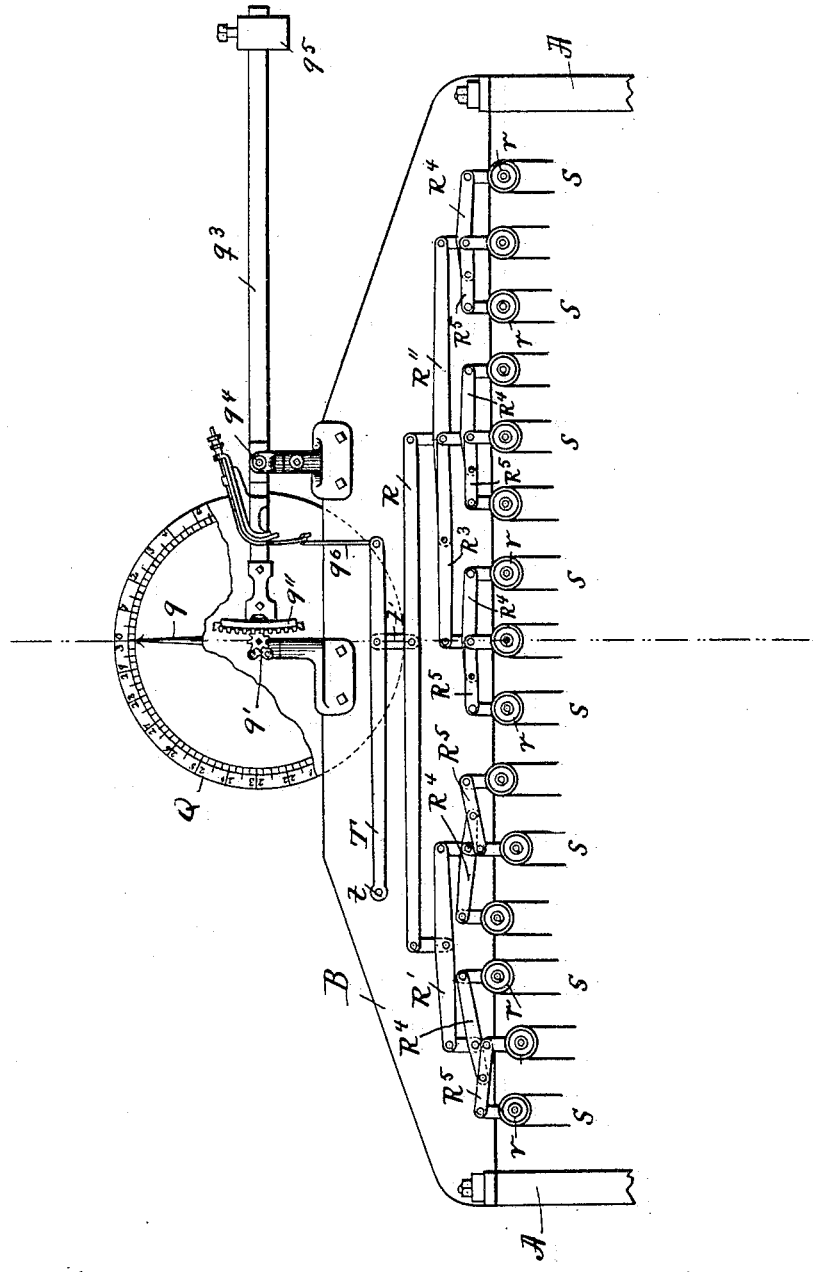

No. 781,900. Patented February 7, 1905.

UNITED STATES PATENT OFFICE.

JOSIAH E. NIGHTINGALE, OF DANVERS, MASSACHUSETTS.

INDICATOR DEVICE FOR MACHINES FOR MEASURING AREAS OF SURFACES.

SPECIFICATION forming part of Letters Patent No. 781,900, dated February 7, 1905.

Application filed June 11, 1904. Serial No. 212,113.

*To all whom it may concern:*

Be it known that I, JOSIAH E. NIGHTINGALE, a citizen of the United States, and a resident of Danvers, in the county of Essex and State of Massachusetts, have invented certain new and useful Improvements in Indicator Devices for Machines for Measuring Areas of Surfaces, of which the following is a specification.

This invention relates to improvements in indicator devices for machines for measuring the areas of surfaces of the kind shown and described in the patent granted to me September 4, 1900, No. 657,444.

The invention is carried out as follows, reference being had to the accompanying drawing, which represents a front view of the improved indicator device.

In my former patent above mentioned the graduated dial Q and its index-pointer $q$ were located at one side of the middle portion of the machine, which is objectionable, as it prevents the operator standing in front of the middle part of the machine to accurately ascertain the reading of the dial on account of its pointer being arranged a little distance in front of said dial, similar to the hand of a clock-face. In my present invention I have so arranged the lever-connecting mechanism of the indicator device as to enable me to place the graduated dial directly at the middle portion of the machine, by which the reading of the dial by the operator directly facing it is accurately accomplished without error caused by looking at the dial in an oblique direction.

In the drawing, A A represent the upright end frames, to which is connected the crossbar B, which serves as a support for the dial and indicating devices, as shown in my above-mentioned patent.

Q is the graduated dial, secured to the crossbeam B, and $q$ is the index, secured to the shaft of the pinion $q'$, the teeth of which mesh in the teeth of the segment $q''$ on one end of the beam $q^3$, which is pivoted at $q^4$ and provided with a balance-weight $q^5$, as is common in devices of this kind.

$q^6$ is a link connected to the beam $q^3$, as usual.

In connection with said beam and dial I use a system of levers as follows: To the frame B I pivot at $t$ a lever T, which is preferably pivoted axially below the dial to a link $t$, as shown. The free end of said lever T is connected by means of the link $q^6$, as shown. The lower end of the link $t'$ is pivotally connected to the lever R, the longer end of which is pivotally connected by a link to a lever R'. The shorter end of the lever R is pivotally connected by a link to a lever R'', and to the shorter end of the latter is pivotally connected a lever R³ similar to the one marked R' on the longer end of the lever R. The ends of the levers R' R³, as well as the longer end of the lever R'', are pivotally connected by links to levers R⁴. The shorter ends of the levers R⁴ are pivotally connected to levers R⁵, from the ends of which are suspended the pulleys $r$ $r$. Similar pulleys are also suspended from the longer ends of the levers R⁴, as shown. Over each pulley is carried a chain S, the lower ends of which are suitably connected to the usual segmental gears used in measuring-machines of this kind and fully shown and described in my above-mentioned patent.

It will be noticed that the arrangement of the levers R, R', R'', R³, R⁴, and R⁵ is the same as in my patent mentioned, but by such arrangement I am obliged to locate the dial Q to one side of the machine, which, as hereinbefore stated, is objectionable. By the addition of an upper lever T suspended from the beam $q^3$ and pivotally connected to the lever R, I am enabled to locate the dial Q midway between the end frames A A, as shown in the drawing, in which X represents the middle line of the machine.

What I wish to secure by Letters Patent and claim is—

In a machine for measuring the areas of surfaces, a system of levers, composed of an upper lever T suspended from the beam $q^3$ and pivotally connected in one end to the frame of the machine, a lever R, having a long and short arm pivotally connected to the free end of lever T, a lever R' pivotally connected to the larger arm of lever R, a lever R'', having a long and short arm, pivotally connected to the short arm of lever R, a lever R³ pivotally connected to the short arm of the lever R'', a series of levers R⁴ having each a long and short arm pivotally connected to opposite ends of the levers R' R³, and to the longer arm of lever R'', a series of levers R⁵ pivotally connected to the shorter arms of the levers R⁴, and a series of pulleys $r, r$, suspended from the ends of the levers R⁵ and the longer arms of the levers R⁴, and chains or cords S leading from said pulleys to the hubs of the segmental gears of a measuring-machine as and for the purpose set forth.

In testimony whereof I have affixed my signature in presence of two witnesses.

JOSIAH E. NIGHTINGALE.

Witnesses:
ALBAN ANDRÉN,
HELEN F. ANDRÉN.